Oct. 11, 1938.   C. E. WORKMAN ET AL   2,132,840
RESILIENT MOUNTING
Filed Dec. 17, 1936

INVENTOR
CLARENCE E. WORKMAN
AND
LEROY M. KUBAUGH
BY Albert L. Ely
ATTORNEY

Patented Oct. 11, 1938

2,132,840

UNITED STATES PATENT OFFICE

2,132,840

RESILIENT MOUNTING

Clarence E. Workman and Le Roy M. Kubaugh, Akron, Ohio, assignors to The Firestone Tire & Rubber Company, Akron, Ohio, a corporation of Ohio Application December 17, 1936, Serial No. 116,314

6 Claims. (Cl. 248—22)

This invention relates to resilient mountings, and more especially it relates to resilient, vibration absorbing structures that are positionable between respective supporting and supported structures that are movable relatively of each other. The invention is of primary utility for supporting motors or other heavy machinery that vibrates during use.

The chief objects of the invention are to provide a mounting of the character mentioned that is so constructed as to prevent excessive rebound of the vibratory structure; and to provide a metal and rubber structure of the character mentioned wherein the metal will serve as a support for the supported member in the event of failure of the adhesion of the rubber to the metal. Another object is to provide a resilient mounting of such construction that the supported member may be attached to or removed from it without disturbing the attachment of the mounting to the supporting structure. Other objects will be manifest as the specification proceeds.

Figure 1:
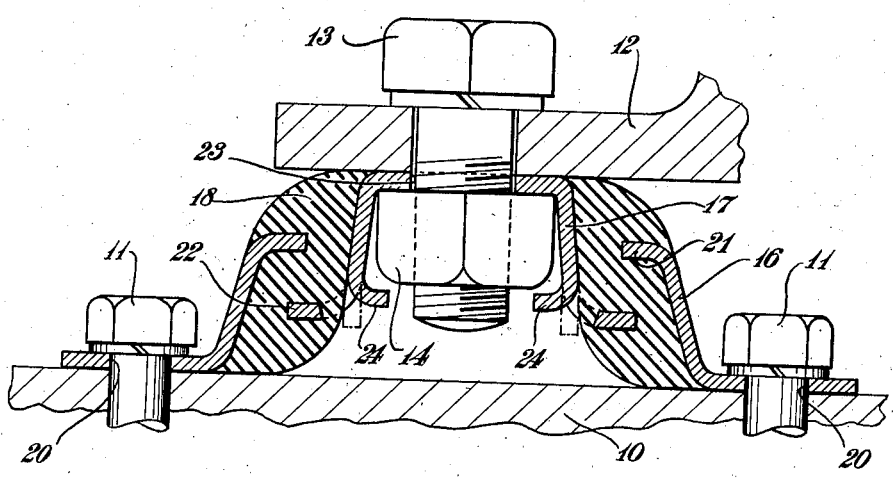
Figure 1 is a diametric sectional view of a resilient mounting embodying the invention, in its preferred form, along the long axis thereof, and a portion of a supporting and a supported structure with which the mounting is operatively associated.

Referring to the drawing, 10 is a supporting structure to which the resilient mounting is attached by means of cap-screws or bolts 11, 11, and 12 is a supported structure which may be and usually is a vibratory body, the latter being secured to the resilient support by means of a bolt 13 that includes a nut 14.

The resilient mounting structure comprises two annular, cup-shaped metal members 16 and 17 respectively that are disposed in telescoped but spaced apart relation, and a dome-shaped body of resilient rubber 18 bonded to said metal members by vulcanization and occupying the space between them, portions of said metal members being embedded in the rubber structure.

As shown in Figure 1 of the drawing, the cup-shaped metal members are in inverted position. The largermost metal member 16 is of general frusto-conical shape, and is formed with opposite ears 19, 19 that extend radially outwardly from its lowermost margin and are formed with respective apertures 20 for receiving the attaching screws 11. The side wall of the member 16 tapers upwardly, and its upper marginal portion curves radially inwardly to provide a flange 21. The uppermost metal member 17 has a side wall that is hexagonal transversely, as is most clearly shown in Figure 2, and at the lower end of the member said side wall merges into a circular formation that curves radially outwardly to provide a flange 22. The outside diameter of the flange 22 is somewhat larger than the inside diameter of the flange 21 of the lower metal member, and in the assembled mounting flange 22 is disposed below flange 21. At its upper end, the wall of the metal member 17 extends normal to the axis of the mounting, flush with the top thereof, and is formed with an axial aperture 23 for receiving the bolt 13. At the rounded juncture of the side wall and the flange 22, tongues 24, 24 are struck out from the member 17 at diametrically opposite points, said tongues being initially disposed substantially in continuation of two of the flat sides of the member, as shown in broken lines in Figure 1. Subsequently the tongues are bent inwardly, over the nut 14, as shown, to prevent removal of the said nut.

The resilient rubber body 18 of the mounting is so vulcanized to the metal inserts 16, 17 as to hold the same in axial alignment and in telescoped relation, with the flange 21 of member 16 above and in overhanging relation to flange 22 of member 17. On the outer face of the mounting the rubber structure 18 is formed as a rounded shoulder that merges with the frusto-conical outer face of metal member 16, and also merges into the plane of the top of the mounting a little outside the metal member 17. On the inner face of the mounting the rubber structure is formed a rounded shoulder that extends from the rounded juncture of the side wall and peripheral flange 22 of metal member 17, to the plane of the bottom face of metal member 16, merging with the said plane inwardly of the adjacent structure of said metal member.

The arrangement is such that when the resilient mounting is positioned between a supporting member and a supported member, as shown in Figure 1, a small region of the rubber structure is in contact with said supporting and supported structures. Because of the rounded profile of the rubber contiguous with said regions of contact, said regions increase in area as the mounting is deformed when the supporting member 12 moves toward the supporting member 10 due to vertical vibration of one or both of said members. Thus the mounting offers progressively increasing resistance to such deformation as exerts a compressive force upon the rubber. Upon rebound, when the supporting and supported members move apart, the resilient mounting yieldingly resists such movement by reason of the tension to which the major portion of the rubber of the structure is subjected. Furthermore, rebound is resisted to some extent by the resistance to compression of that portion of the rubber structure 18 that is disposed between the overlapping flanges 21, 22 of the metal inserts 16, 17, which flanges move toward each other as the supported and supporting members move apart.

In the event of failure of the bond between the rubber and the metal inserts of the resilient mounting, the telescoped inserts act as a safety device to prevent complete separation of the supported and the supporting members. By reason of the hexagonal shape of the upper metal insert 17, said insert functions as a socket for the nut 14, and will prevent the latter from turning when the bolt 13 is turned in either direction. The inturned tongues 24 retain the nut in said socket when the bolt 13 is removed. The arrangement is such that the supported member 12 may be removed from or mounted upon the resilient mounting without requiring the latter to be removed from the supporting member 10.

In the event that less resilience in the mounting is desired, as when the supported member is heavier than that shown, the inner metal member may be made larger in diameter, with the result that there is less rubber in the mounting and consequently less resilience.

Figure 2:
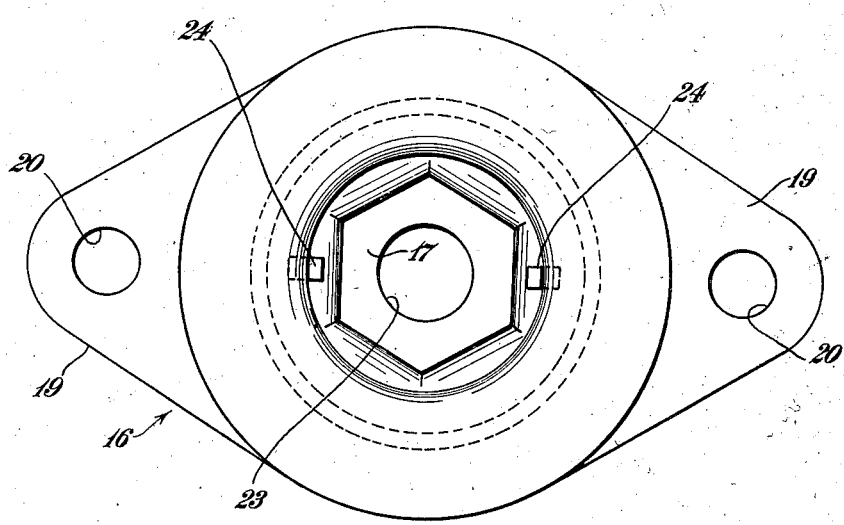
Figure 2 is a bottom plan view of the resilient mounting structure.
Figure 3:
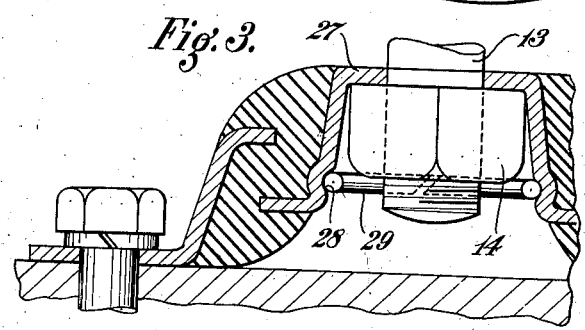
Figure 3 is a fragmentary diametric section of a modified embodiment of the invention.

The modified embodiment of the invention shown in Figure 3 differs from the structure shown in Figures 1 and 2 solely in the construction of the inner metal member and the means for retaining the nut therein. Said inner metal member, designated 27, is similar to inner metal member 17 previously described except that it has no tongues 24 stuck out from its structure. Instead, it is formed, in its inner peripheral face in the region immediately below the nut 14, with a concentric circumferential groove 28, and receivable in said groove is a split ring 29 that may be sufficiently constricted to permit of its mounting in said groove. The ring 29 retains the nut 14 in its socket when the bolt 13 is removed.

Other modification may be resorted to without departing from the spirit of the invention or the scope of the appended claims.

What is claimed is:

1. A resilient mounting consisting of an annular dome-shaped structure comprising a metal annulus about the outer periphery thereof, a metal annulus about the radially inner surface thereof in axially offset relation to the first mentioned annulus, and a body of rubber covering the outer peripheral face of the inner metal member and the inner peripheral face of the outer metal member and bonded to each of them, a substantial portion of the body of rubber being unconfined and exposed on the outer and inner surfaces thereof, one marginal portion of each of said metal members being formed as a peripheral flange that extends into said rubber body, the flange of the outer metal member overlying the flange of the inner metal member in axially spaced relation thereto.

2. A resilient mounting consisting of an annular dome-shaped structure of rubber and metal and comprising an annular inner metal member and an annular outer metal member arranged in partly telescoped relation to each other, an annular body of rubber interposed between said annular metal members, the telescoped portions of said metal members being formed with respective marginal flanges that overlap each other, in axially spaced relation, interiorly of said rubber body, said rubber body having a substantial portion thereof that is unconfined.

3. A resilient mounting consisting of an annular dome-shaped structure of rubber and metal and comprising an annular inner metal member and an annular outer metal member arranged in partly telescoped relation to each other, the telescoped portions of said members being formed with respective marginal flanges that overlap each other, in axially spaced relation, interiorly of the rubber structure of the mounting, said rubber structure comprising a rounded shoulder that merges with the plane of the projecting end of the inner metal member, and a rounded shoulder that merges with the plane of the projecting end of the outer metal member.

4. A resilient mounting consisting of an annular dome-shaped structure of rubber and metal and comprising a metal insert on its inner periphery extending to the top thereof, said insert being axially apertured to receive a bolt by means of which a structure is secured to said mounting, said insert being of polygonal shape in transverse section so as to constitute a socket for receiving a nut on said bolt, and to prevent rotation of said nut, and means positionable inwardly of the socket for retaining the nut in said socket when the bolt is removed.

5. A combination as defined in claim 4 in which the means for retaining the nut in the socket comprises a pair of ears formed on the metal insert and bent over the nut.

6. A combination as defined in claim 4 in which the means for retaining the nut in the socket comprises a split ring that is mounted below the nut in a concentric groove formed in the inner periphery of the metal insert.

CLARENCE E. WORKMAN.
LE ROY M. KUBAUGH.